(12) United States Patent
Chini et al.

(10) Patent No.: US 9,154,265 B2
(45) Date of Patent: Oct. 6, 2015

(54) FAST DETECTION/MITIGATION AND RECOVERY FOR SEVERE EMI CONDITIONS IN AUTOMOTIVE AREA NETWORKS

(71) Applicant: BROADCOM CORPORATION, Irvine, CA (US)

(72) Inventors: Ahmad Chini, Mission Viejo, CA (US); Mehmet Vakif Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/483,322

(22) Filed: Sep. 11, 2014

(65) Prior Publication Data

US 2015/0071334 A1 Mar. 12, 2015

Related U.S. Application Data

(60) Provisional application No. 61/876,558, filed on Sep. 11, 2013.

(51) Int. Cl.
| | |
|---|---|
| *H04L 1/08* | (2006.01) |
| *H04B 1/10* | (2006.01) |
| *H04J 11/00* | (2006.01) |
| *H04B 17/345* | (2015.01) |
| *H04W 4/00* | (2009.01) |
| *H04W 4/04* | (2009.01) |
| *H04L 25/03* | (2006.01) |

(52) U.S. Cl.
CPC .. *H04L 1/08* (2013.01); *H04B 1/10* (2013.01); *H04B 17/345* (2015.01); *H04J 11/0023* (2013.01); *H04W 4/008* (2013.01); *H04W 4/046* (2013.01); *H04L 25/03057* (2013.01)

(58) Field of Classification Search
CPC ..... H04L 1/08; H04L 67/12; H04L 25/03057; H04L 1/0003; H04L 1/0025; H04L 12/40032; H04L 12/4013; H04L 12/40136; H04L 12/40156; H04L 12/40163; H04L 12/403; H04L 12/4035; H04L 12/407; H04L 12/41; H04B 17/345; H04B 1/10; H04J 11/023; H04W 4/008; H04W 4/046
See application file for complete search history.

(56) References Cited

U.S. PATENT DOCUMENTS

| | | | |
|---|---|---|---|
| 2007/0104285 A1* | 5/2007 | Chan et al. | 375/267 |
| 2011/0201277 A1* | 8/2011 | Eguchi | 455/63.3 |

(Continued)

*Primary Examiner* — Hirdepal Singh
(74) *Attorney, Agent, or Firm* — Garlick & Markison; Bruce E. Garlick

(57) ABSTRACT

A vehicle communication network device includes a transceiver configured to communicatively couple with a remote transceiver of another vehicle communication network device via a wired media and processing circuitry coupled to the transceiver. The device detects interference on the wired media that exceeds an interference threshold level. Upon the detection, the device enters a quiet mode during which no data is transmitted on the wired media. After exiting the quiet mode, the device enters an idle mode during which known data is transmitted on the wired media and during which the device receives known data from the remote transceiver. The device retrains its transceiver based upon the known data and after retraining the transceiver, exchanges data with the remote transceiver. The device may also buffer data for transmission, upon the detection, determine buffered data that was likely corrupted by the interference, and after retraining, retransmit the determined buffered data.

20 Claims, 10 Drawing Sheets

(56) References Cited

U.S. PATENT DOCUMENTS

| | | |
|---|---|---|
| 2013/0170439 A1* | 7/2013 | Anderson et al. ............. 370/329 |
| 2013/0243052 A1* | 9/2013 | Barnickel et al. ............. 375/219 |
| 2013/0264881 A1* | 10/2013 | Roeper et al. ................... 307/77 |
| 2014/0024323 A1* | 1/2014 | Clevorn et al. .................. 455/83 |
| 2014/0112400 A1* | 4/2014 | Reuven ......................... 375/258 |
| 2014/0153630 A1* | 6/2014 | Strobel et al. ................. 375/229 |
| 2014/0187276 A1* | 7/2014 | Cyzs et al. ..................... 455/501 |
| 2014/0241282 A1* | 8/2014 | Mueller et al. ................ 370/329 |

\* cited by examiner

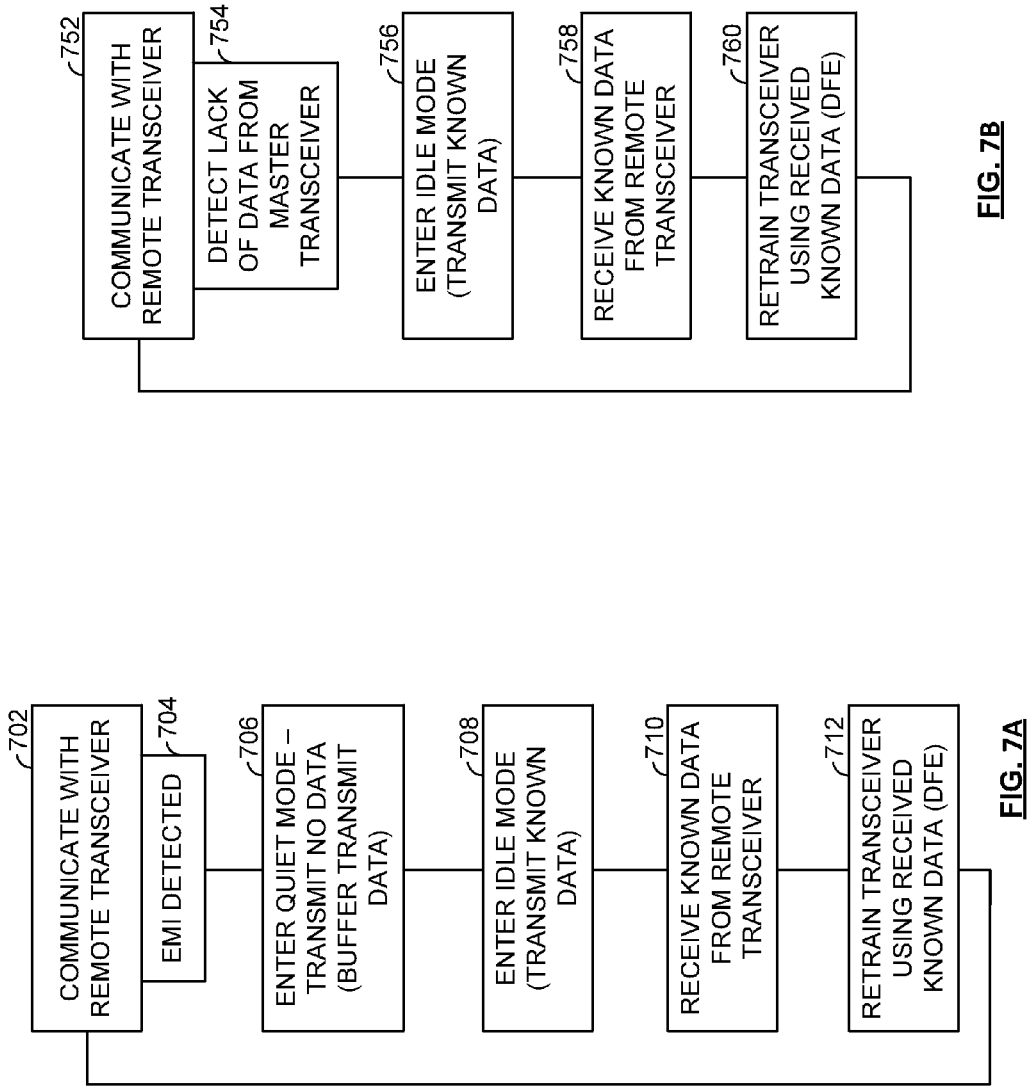

FAST DETECTION/MITIGATION AND RECOVERY FOR SEVERE EMI CONDITIONS IN AUTOMOTIVE AREA NETWORKS

CROSS REFERENCE TO PRIORITY APPLICATIONS/INCORPORATION BY REFERENCE

The present U.S. Utility Patent Application claims priority pursuant to 35 U.S.C. §119(e) to U.S. Provisional Application No. 61/876,558, entitled "Fast Detection/Mitigation and Recovery for Severe EMI Conditions in Automotive Area Networks," filed Sep. 11, 2013, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

1. Technical Field

This disclosure relates generally to communications and more particularly to data and multimedia communications within a vehicle.

2. Description of Related Art

As is known, a vehicle (e.g., automobile, truck, bus, an agricultural vehicle, ship, and/or aircraft) includes a vehicle communication network. The complexity of the vehicle communication network varies depending on the number and complexity of electronic devices within the vehicle. For example, advanced vehicles include electronic modules for engine control, transmission control, antilock braking, body control, emissions control, etc. To support the various electronic devices within the vehicle, the automotive industry has generated numerous communication protocols.

FIG. 1 is a schematic block diagram of a prior art vehicular communication network that illustrates the various bus protocols and the electronic devices that utilize such protocols. The bus protocols include: (1) J1850 and/or OBDII, which are typically used for vehicle diagnostic electronic components; (2) Intellibus, which is typically used for electronic engine control, transmission control or other vehicle systems such as climate control, and it may also be used for drive-by-wire electronic control units (ECU); (3) high-speed controller area network (CAN), which is typically used for braking systems and engine management systems; (4) distributed system interface (DSI) and/or Bosch-Siemens-Temic (BST), which is typically used for safety related electronic devices; (5) byteflight, which is typically used for safety critical electronic device applications; (6) local interconnect network (LIN), which is typically used for intelligent actuators and/or intelligent sensors; (7) low-speed controller area network (CAN) and/or Motorola® interconnect (MI), which are typically used for low-speed electronic devices such as Windows, minors, seats and/or climate control; (8) mobile media link (MML), domestic digital data (D2B), smartwireX, inter-equipment bus (IEBus), and/or media oriented systems transport (MOST), which are typically used to support multimedia electronic devices within a vehicle such as a audio head unit and amplifiers, CD player, a DVD player, a cellular connection, a Bluetooth connection, peripheral computer connections, rear seat entertainment (RSE) units, a radio, digital storage, and/or a GPS navigation system; (9) Low-Voltage Differential Signaling (LVDS), which are typically used to support heads up display, instrument panel displays, other digital displays, driver assist digital video cameras, and (10) FlexRay, which may be used for safety critical features and/or by-wire applications.

Not only are the multiple communication networks within the vehicle complex, but they also typically require separate wiring for each group of devices that share common protocol(s). A typical vehicle includes 400 to 600 pounds of wiring, which makes wiring the second heaviest component in a vehicle; the engine is the heaviest. Integrating the multiple vehicle communication networks into fewer networks is desirable not only for reduction in complexity but also to reduce wiring needs. Unfortunately, reduction in wiring and using lower cost wiring makes the vehicular communication network(s) more susceptible to Electro Magnetic Interference (EMI), which adversely affects intra-vehicle communications and vehicle reliability.

BRIEF DESCRIPTION OF THE SEVERAL VIEWS OF THE DRAWING(S)

FIG. 7A is a flow chart illustrating operation of a device operating as a master in accordance with the present disclosure;

FIG. 7B is a flow chart illustrating operation of a device operating as a slave in accordance with the present disclosure;

DETAILED DESCRIPTION OF THE DISCLOSURE

Figure 2:
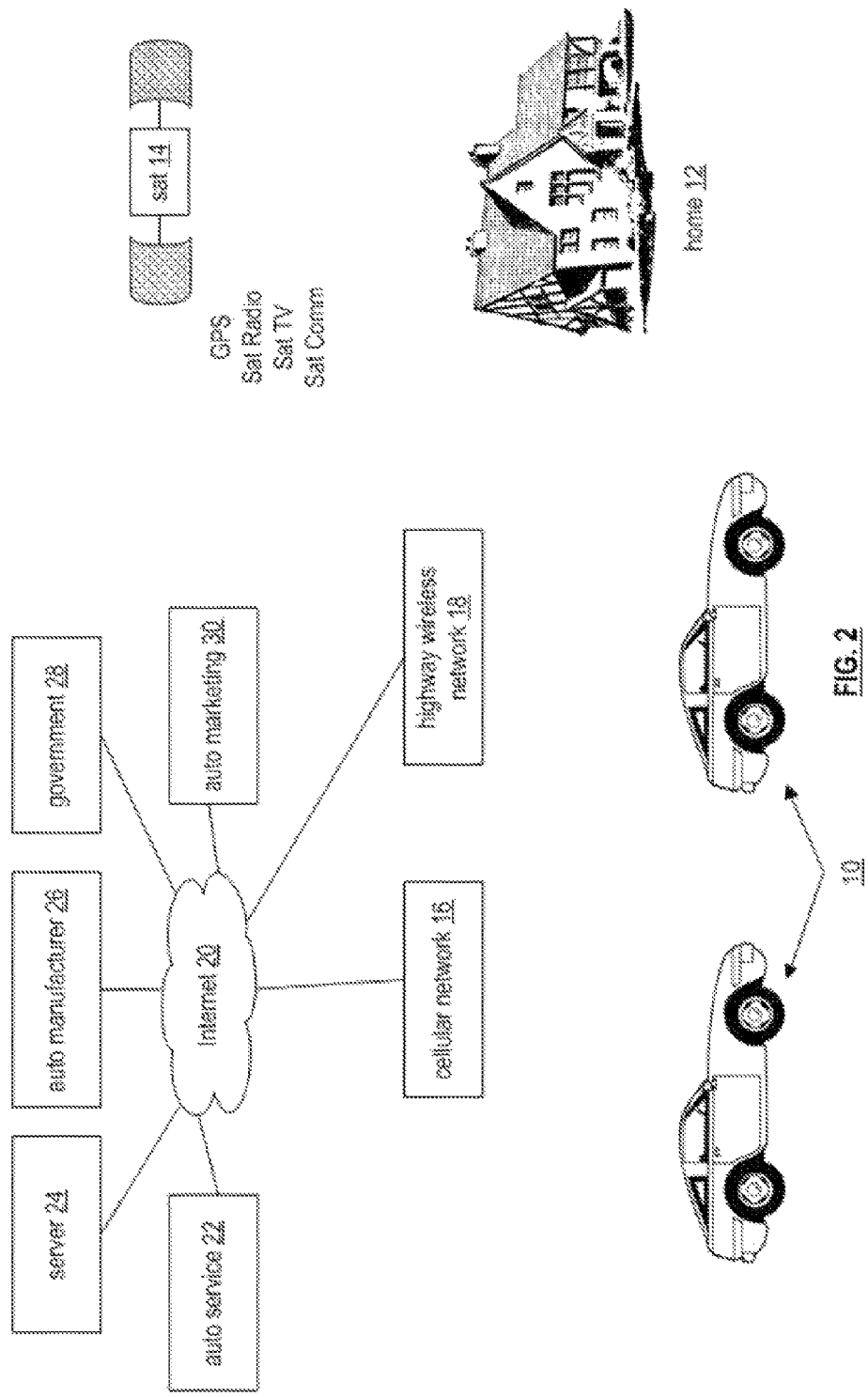
FIG. 2 is a system diagram illustrating a communication system in accordance with the present disclosure.

FIG. 2 is a system diagram illustrating a communication system in accordance with the present disclosure. The communication system includes vehicles 10, a home network 12, a satellite transceiver 14, a cellular network 16, a highway wireless network 18, the Internet 20, an automobile service provider 22, a server 24, an automobile manufacturer 26, government 28, and/or automobile marketing 30. In this system, each vehicle 10 includes a packet/frame-based communication network that enables it to communicate with other vehicles, with its home network 12, with the satellite transceiver 14 (GPS, satellite radio, satellite TV, satellite communication, etc.), with the cellular network 16, and/or with the highway wireless network 18. Note that the highway wireless network 18 may include a plurality of wireless transceivers located proximal to highways, roads, rest areas, etc.

In an example of operation, a vehicle 10 may communicate with an automobile service provider 22 (e.g., engine tune-up, brake system, a transmission system, etc.) via the cellular network 16, the highway wireless network 18, and/or its home network 12. Such a communication includes the vehicle 10 transmitting data regarding its operational status (e.g., number of hours since last engine tune-up, wear & tear on the break system, brake fluid level, oil level, transmission fluid level, etc.). The automobile service provider 22 interprets the operational status data to determine if the vehicle 10 is in need of service and/or if a component failure is likely to occur in the near future. Based on this interpretation, the automobile service provider 22 sends data to the vehicle indicating whether service is needed and may further include data to schedule an appointment for such service.

In another example of operation, a vehicle 10 collects data regarding its performance (e.g., fuel efficiency, component wear & tear, real-time engine control, real-time braking system control, real-time transmission control, etc.), which it transmits to the auto manufacturer 26. The auto manufacturer 26 utilizes the data for a variety of purposes, such as improving future designs, determining need for recalls, etc.

In yet another example of operation, a vehicle 10 may communicate with a server to upload data and/or download data. As a more specific example, the server may provide streaming video of television shows, movies, etc. For a subscription fee, the vehicle 10 downloads the streaming video for display on rear seat entertainment systems and/or other displays within the vehicle. As another specific example, the vehicle 10 may upload data (e.g., video taken by cameras of the car, user data contained on a laptop computer, video game inputs and/or controls, etc.) to the server.

In a further example of operation, the vehicle 10 may communicate with a government agency 28 (e.g., driver motor vehicle) to update registration information, insurance information, etc. As another example, the vehicle 10 may communicate specific performance information (e.g., general vehicle operation, emissions test, etc.) with the government agency 28 for compliance with different government programs (e.g., emissions control, safety check, etc.).

In a still further example of operation, the vehicle 10 may receive marketing information from an auto-marketing provider 30. For instance, the vehicle 10 may receive commercial information based on the vehicle's location, driver's interests, recent communications to and/or from the vehicle, etc.

According to the present disclosure one or more devices of vehicle 10 include structure and supported operations to resist and recover from severe Electro Magnetic Interference (EMI) that affects communications serviced by such devices. EMI may be caused by neighboring vehicles, caused by internal or external RF communications, radar guns, electronic devices within the vehicle 10, and by various other EMI sources. The structure and operation of the present disclosure consistent therewith will be described in detail with reference to FIGS. 4A-10.

Figure 3:
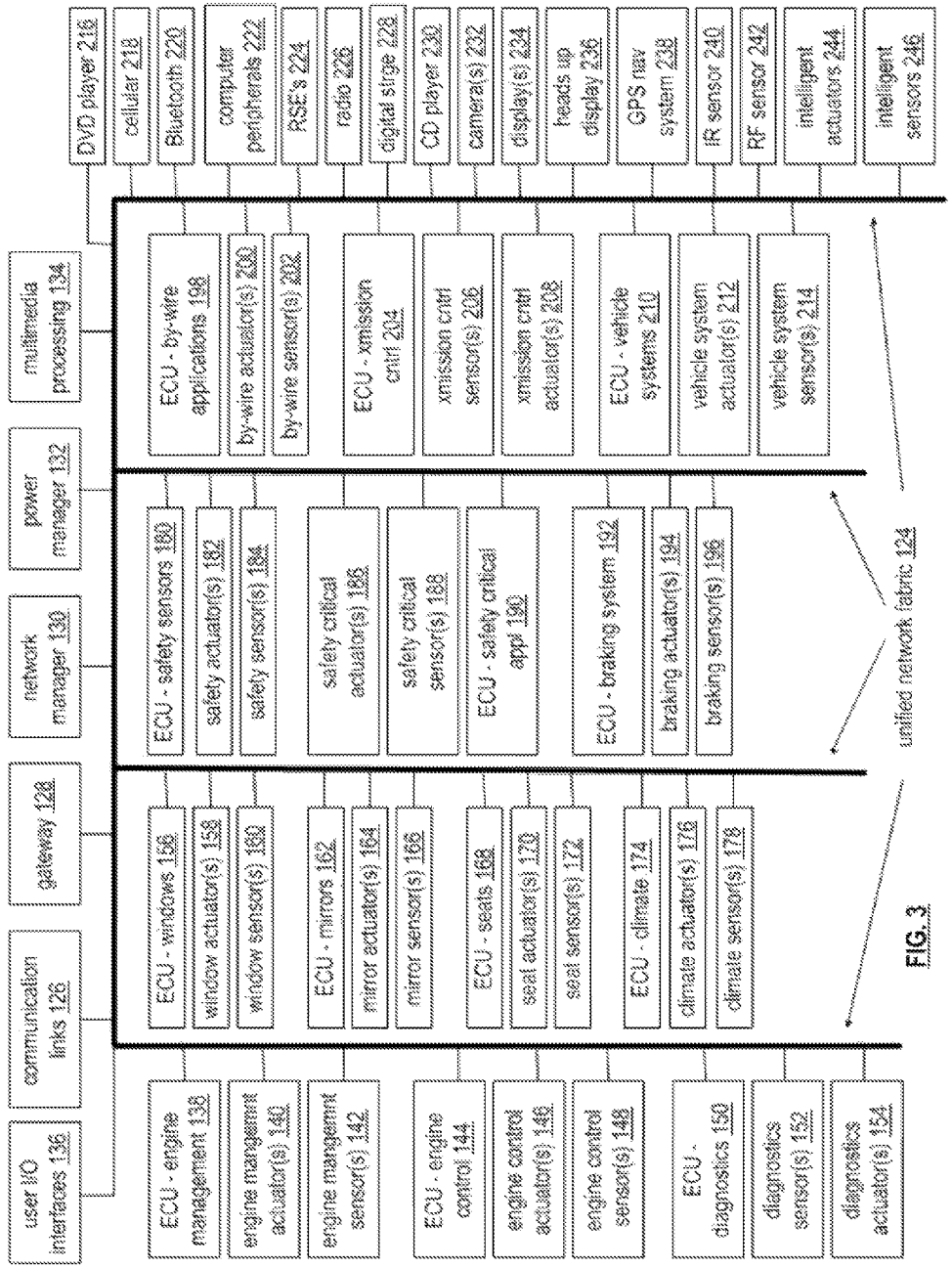
FIG. 3 is a block diagram illustrating an embodiment of a vehicular communication network in accordance with the present disclosure.

FIG. 3 is a block diagram illustrating an embodiment of a vehicular communication network in accordance with the present disclosure. The vehicular communication network includes a unified network fabric 124, one or more communication links 126, and a plurality of devices including a gateway 128, a network manager 130, a power manager 132, one of more multimedia processing modules 134, a plurality of user input and/or output interfaces 136 (e.g., seat adjust, window control, radio control, mirror control, GPS control, cruise control, etc.), and a plurality of other devices. These other devices may include one or more of each of an engine management electronic control unit 138, an engine management actuator 140, an engine management sensor 142, an engine control electronic control unit 144, an engine control actuator 146, an engine control sensor 148, a diagnostic electronic control unit 150, a diagnostic sensor 152, a diagnostic actuator 154, a window electronic control unit 156, a window actuator 158, a window sensor 160, a minor electronic control unit 162, a minor actuator 164, a minor sensor 166, a seat electronic control unit 168, a seat actuator 170, a seat sensor 172, a climate electronic control unit 174, a climate actuator 176, a climate sensor 178, a safety sensor electronic control unit 180, a safety actuator 182, a safety sensor 184, a safety critical application electronic control unit 186, a safety critical actuator 188, a safety critical sensor 190, a braking system electronic control unit 192, a breaking actuator 194, a breaking sensor 196, a by-wire application electronic control unit 198, a by-wire actuator 200, a by-wire sensor 202, a transmission control electronic control unit 204, a transmission control sensor 206, a transmission control actuator 208, a vehicle system electronic control unit 210, a vehicle system actuator 212, a vehicle system Sensor 214, a DVD player 216, a cellular telephone interface 218, a Bluetooth interface 220, a computer peripheral interface 222, a rear seat entertainment interface and/or unit 224, a radio 226, digital storage 228, a CD player 230, a camera 232, a display 234, a heads-up display 236, a GPS navigation system 238, an infrared sensor 240, a radio frequency sensor 242, an intelligent actuator 244, and/or an intelligent sensor 246.

Figure 1:
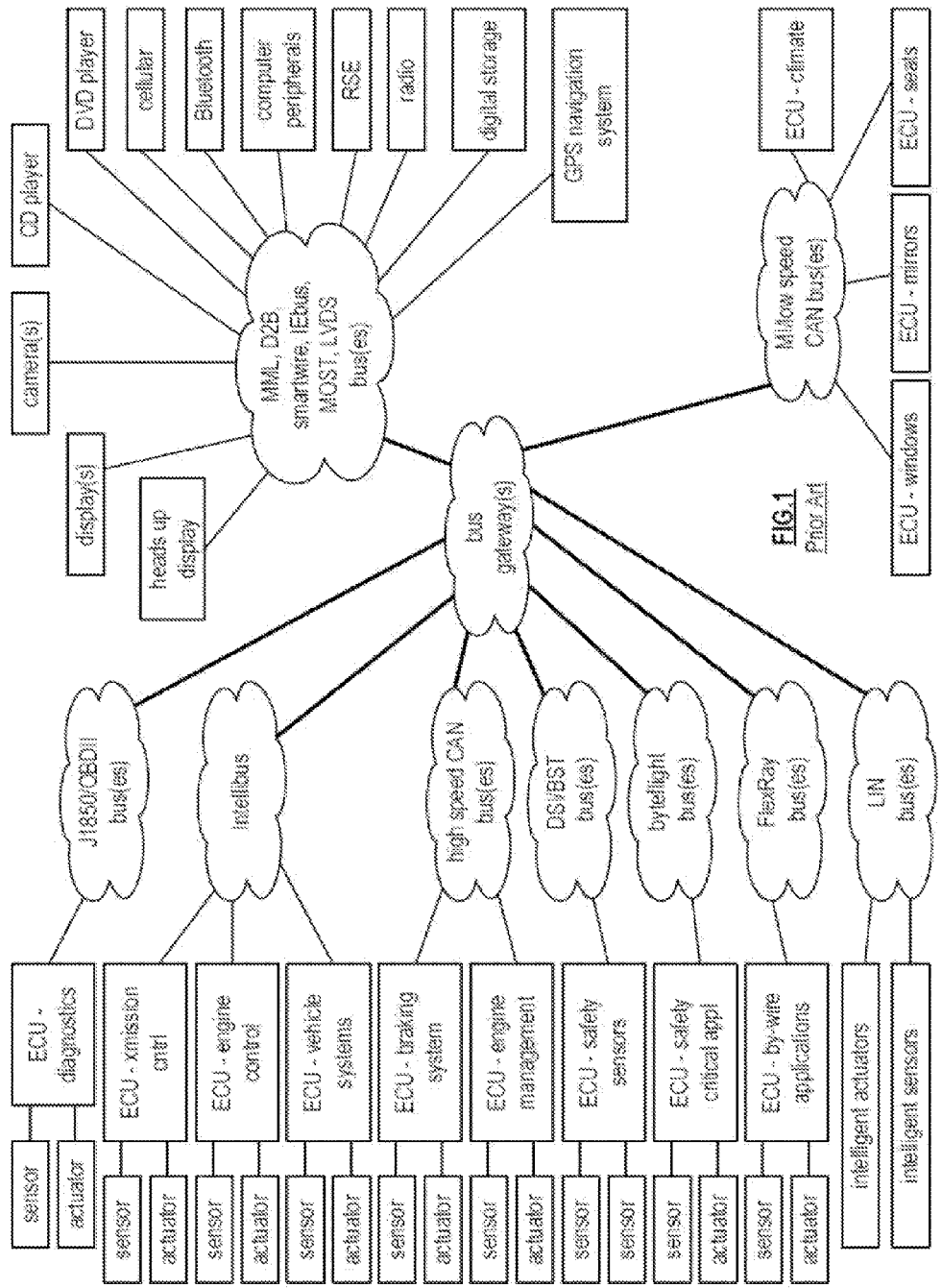
FIG. 1 is a block diagram illustrating a prior art intra-vehicular communication network.

In FIG. 3, the devices interconnect via the unified network fabric 124. The unified network fabric 124 may inter couple the devices in various configurations including ring configurations, star configurations, direct links, etc. In any of these configurations, one device directly connects to another device via a wired and/or a wireless connection. In some embodiments, these connections will be via Unshielded Twisted Pair (UTP) wiring and use one or more communication protocols, e.g., as described with reference to the prior art in FIG. 1 or one or more new communication protocols. In any case, when communications are serviced via UTP wiring (or other unshielded or marginally shielded wiring), they are susceptible to EMI. As will be described further with reference to FIG. 4A, each device includes structure sufficient to withstand some level of EMI using standard filtering components, e.g., Feed Forward Equalizers (FFEs), Decision Feedback Equalizers (DFEs), and/or various other types of filters/equalizers that are resistant to EMI. However, when EMI is severe, these conventional components cannot service communications in an acceptable manner.

Thus, according to the present disclosure, one or more devices illustrated in FIG. 3 include structure and support operations to resist and recover from moderate to severe EMI. The structure and operation of these devices will be described in detail with reference to FIGS. 4A-10. In short, this structure and supported operations provide fast recovery of communication link service when moderate to severe EMI disrupts communications on unshielded or moderately protected wiring.

Figure 4A:
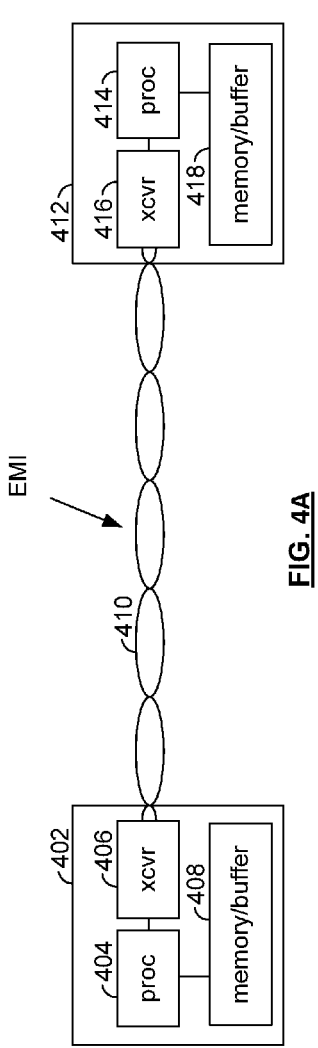
FIG. 4A is a block diagram illustrating two devices coupled and operating according to an embodiment of the present disclosure.

FIG. 4A is a block diagram illustrating two devices 402 and 412 coupled and operating according to an embodiment of the present disclosure. Each of these devices 402 and 412 may be one of the devices illustrated in FIG. 3. Device 402 includes a transceiver 406, a processor 404, and memory/buffer 408. Device 412 includes a transceiver 416, a processor 414, and memory/buffer 418. The transceivers 406 and 416 communicatively couple via wired link 410. Each of the processors 404 and 414 may be one or more of a general purpose processor, a digital signal processor, digital logic and/or other circuitry capable of performing processing operations to support a functional purpose of the respective device 402 or 412. Memory/buffer 408 or 418 may be any type of memory capable of storing data and/or software instructions that is operated upon by processors 404 or 414, respectively. The processing circuitry 404, transceiver 406, and memory/buffer 408 support the required functionality of device 402. Likewise, the processing circuitry 414, transceiver 416, and memory/buffer 418 support the required functionality of device 412. The wired media may be UTP and be subject to EMI. Thus the devices 402 and 412 operate according to the concepts of the present disclosure to recover from severe EMI that will be described further herein. One of the devices 402 may provide power to the other device 412 via the wired link 410. Further, the devices 402 and 412 may provide power to each other via the wired link 410.

Figure 4B:
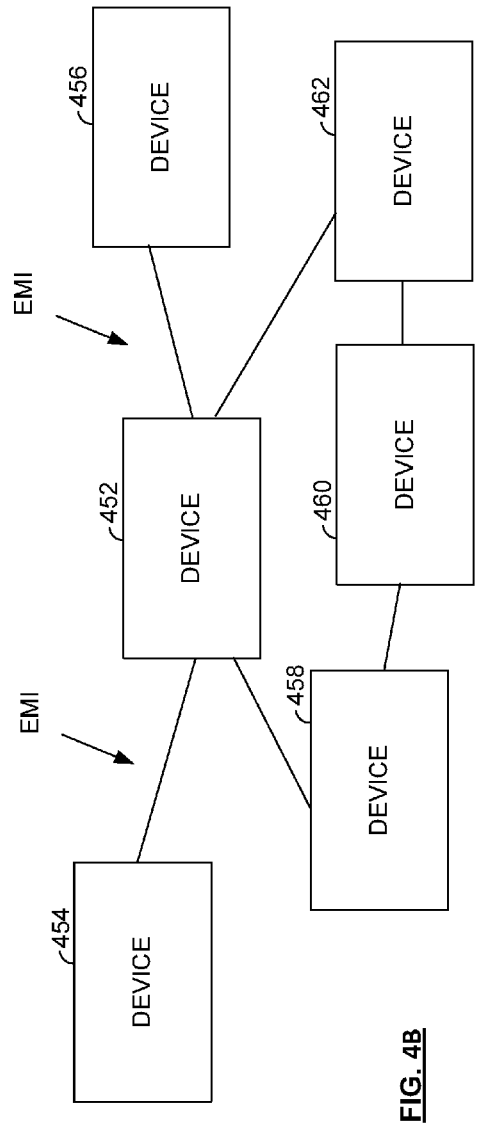
FIG. 4B is a block diagram illustrating a plurality of devices coupled and operating according to an embodiment of the present disclosure.

FIG. 4B is a block diagram illustrating a plurality of devices coupled and operating according to an embodiment of the present disclosure. Each of these devices 452, 454, 456, 458, 460, and 462 has same/similar structure as do the devices 402 and 412 of FIG. 4A. As shown, these devices 452, 454, 456, 458, 460, and 462 inter couple with one another via wired links and are subject to EMI. Thus, these devices 452, 454, 456, 458, 460, and 462 also operate according to the concepts of the present disclosure to recover from sever EMI as is described further herein.

Figure 5A:
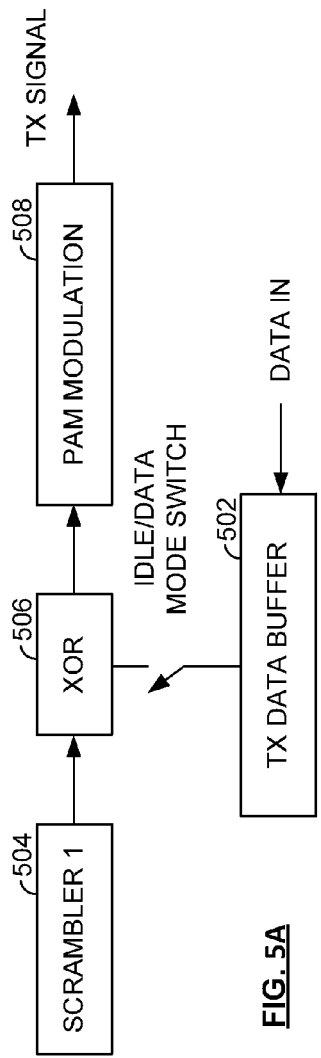
FIG. 5A is a block diagram illustrating transmit components and operation thereof of a device in accordance with the present disclosure.

FIG. 5A is a block diagram illustrating transmit components and operation thereof of a communication device in accordance with the present disclosure. These components include a TX data buffer 502 that receives data for transmission. The TX data buffer 502 may be serviced by the memory/buffers 408 and/or 418 of FIG. 4A. When the transmit components are transmitting data on the wired media, the TX data buffer 502 couples transmit data to the eXclusive OR (XOR) block 506, which combines the transmit data with the output of scrambler 1 504. The output of the XOR block 506 is received by Pulse-Amplitude Modulation (PAM) block 508, which modulates the output to produce a TX signal. The TX signal is coupled to the wired media, intended for receipt by a remote device coupled via the wired media.

Figure 5B:
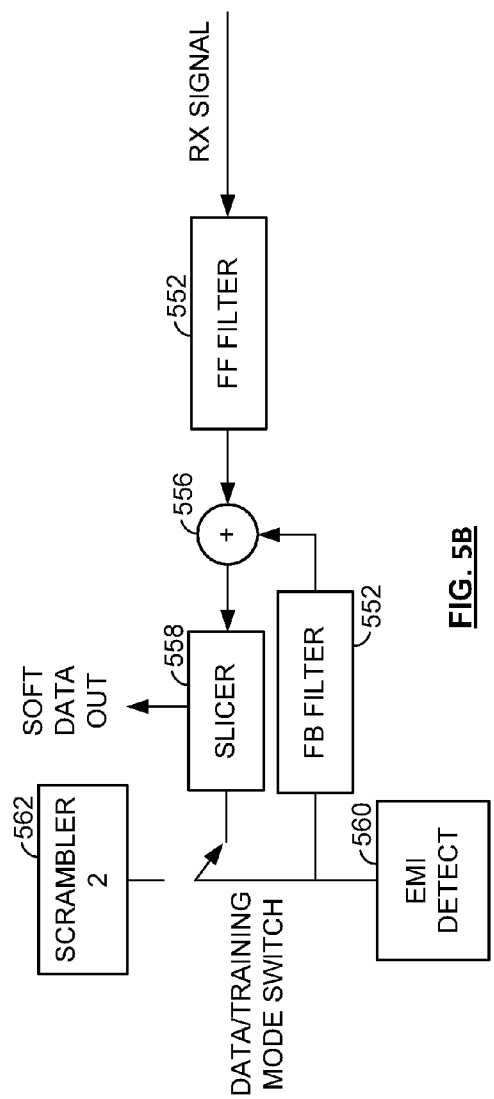
FIG. 5B is a block diagram illustrating receive components and operation thereof of a device in accordance with the present disclosure.

FIG. 5B is a block diagram illustrating receive components and operation thereof of a device in accordance with the present disclosure. The receive components include a Feed Forward Filter 552, summer 556, a Feed Back Filter 552, and data slicer 558, which, during receive operations are considered a Decision Feedback Equalizer (DFE) and coupled in such a configuration where the output of the data slicer 558 serves as input to the Feed Back Filter 552. The slicer 558 produces soft decisions as its output (soft data). EMI detection circuitry 560 detects when EMI present on the wired link exceeds a threshold. When such EMI is detected, the components of both FIGS. 5A and 5B operate to recover the serviced link as described further herein. As will be described herein, during recovery mode, scrambler 2 562 provides known data to the Feed Back Filter 552 for training.

The transmit components of FIG. 5A and the receive components of FIG. 5B service high speed communications, e.g., high speed Ethernet technologies that may support communications similar to IEEE 802.3bp Reduced Twisted Pair Gigabit Ethernet or RTPGE. The components of FIGS. 5A and 5B may operate in one or both of master and slave modes. When in the master mode, the components of FIGS. 5A and 5B control the communication links serviced thereby. When in the slave mode, the components of FIGS. 5A and 5B are responsive to the master of the communication link.

UTP cables are of special interest in automotive applications because of cost and longevity in automotive environment. A major challenge for operating at Giga bit speed over UTP cables is immunity to Radio Interference or EMI. For automotive applications, there are many sources for radio interference including; Citizen band Radios, Ham Radios, Short wave transmitters, TV transmitters, Digital Audio Broadcasting, Mobile base stations, and radio transceivers on Emergency vehicles. Significant noise voltage may be coupled into the UTP cable operating at Giga bit speed. Typically higher rate transmission is subject to more Radio interference because balance of cables and connectors are worse at higher frequencies. UTP cables, connectors, and magnetics are designed as such to minimize the noise at the receiver. The remainder noise is expected to be tolerated or rejected by Physical layer or PHY design.

The PHY design of the devices of FIGS. 5A and 5B should mitigate radio interference while containing radio emission. The emission limits do not allow transmitting signals at more than certain levels. At these limited transmit levels the received radio noise may exceed the levels acceptable for data communication. Proper signal processing techniques are required to mitigate and reject radio interferences under such conditions. To allow rejecting radio interference, wide band modulation techniques are used with bandwidth significantly larger than the radio interferences. Narrow band interference can then be rejected in the equalizer used primarily to mitigate inter-symbol interference.

When the interference is at a moderate level, the DFE adapts automatically to reject (notch out) narrow band EMI. If strong EMI appears suddenly at the receiver, the DFE may become corrupted with too many errors to the point the DFE may be unable to adapt to the EMI and reject the EMI using decision feedback operations. The effects are worse when higher level modulations are used. During these operations, the EMI detection circuitry 560 initiates link recovery operations.

Figure 6A:
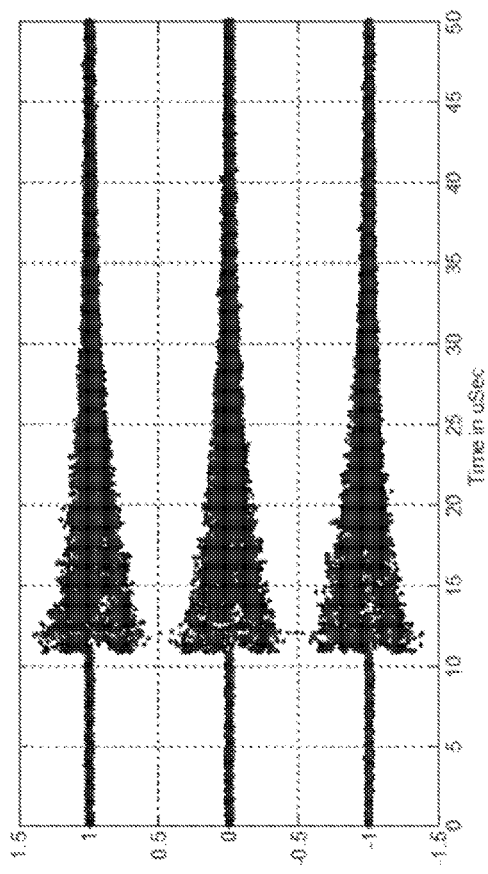
FIG. 6A is a graph illustrating operation of a communication link in accordance with the present disclosure compensating for minor to moderate Electro Magnetic Interference (EMI)

FIG. 6A is a graph illustrating operation of a communication link in accordance with the present disclosure compensating for minor to moderate EMI. FIG. 6A particularly illustrates soft decisions at the slicer 558 input where it is corrupted with moderate EMI. In this case, the DFE automatically adapts to the EMI and the narrowband EMI is rejected in the Feed-Forward filter by rejecting the narrow band noise.

Figure 6B:
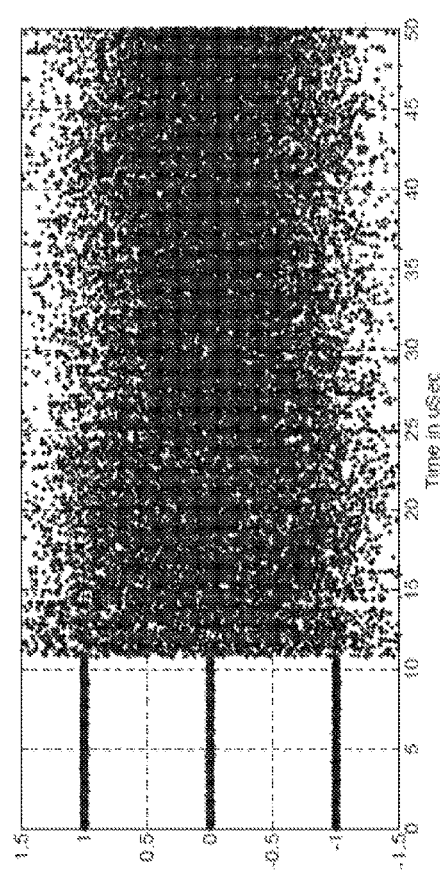
FIG. 6B is a graph illustrating operation of a communication link that is unable to compensate for severe EMI.

FIG. 6B is a graph illustrating operation of a communication link that is unable to compensate for severe EMI. In particular, FIG. 6B shows soft decisions at the slicer 558 input where it is corrupted with EMI that is about 10 dB greater than the EMI illustrated in FIG. 6A. When strong EMI is suddenly applied, for example when an emergency vehicle suddenly turns on its transmitter, too many errors are circulated in the DFE Feed-Back filter 552 and the DFE completely loses its state and is not able to recover its state.

FIG. 7A is a flow chart illustrating operation of a device operating as a master in accordance with the present disclosure. The operations of FIG. 7A begin with the device communicating with a remote device via wired media, e.g., UTP wiring (Step 702). The device operates as the master of the link and the remote device operates as the slave of the link. Operation continues with the device detecting that interference, e.g., EMI, on the wired media exceeds an interference threshold level (Step 704). Detecting that the interference exceeds a threshold is described further with reference to FIGS. 8A, 8B, 9A, and 9B.

Upon the detection, the device enters a quiet mode during which no data is transmitted on the wired media (Step 706). Referring to FIG. 5A, in the quiet mode, the TX data buffer 502 is disconnected from XOR block 506. Further, the output of scrambler 1 504 may be interrupted so that the XOR block 506 produces no data for output. Alternately, the PAM modulator 508 may be disabled to enable the quiet mode.

Referring again to FIG. 7A, after exiting the quiet mode, the device enters an idle mode during which known data is transmitted on the wired media (Step 708). In this operation, the TX data buffer 502 is still disconnected from the XOR block 506 but the scrambler 1 504 provides a scrambling code that the XOR block 506 uses to provide known data at its output, which the PAM modulate block 508 modulates to produce the known data in a modulated transmission format. At this point in the operation, the remote slave device has begun transmitting known data, which is received by the device (710). The device uses the known data to retrain its DFE (Step 712). After retraining is completed, operation returns to step 702 where data is continued to be exchanged with the remote device.

FIG. 7B is a flow chart illustrating operation of a device operating as a slave in accordance with the present disclosure. The operations of FIG. 7B begin with the remote device (slave) communicating with the device (master) via a wired media (Step 752). Operation continues with the device detecting a lack of data being transmitted from the master device (Step 754, corresponding to step 708 of FIG. 7A) and entering a quiet mode in which it transmits no data on the wired link. Referring to FIG. 5A, in the quiet mode, the TX data buffer 502 is disconnected from XOR block 506. Further, the output of scrambler 1 504 may be interrupted so that the XOR block 506 produces no data for output. Alternately, the PAM modulator 508 may be disabled to enable the quiet mode.

Referring again to FIG. 7B, after exiting the quiet mode, the device enters an idle mode during which known data is transmitted on the wired media (Step 756). In this operation, the TX data buffer 502 is still disconnected from the XOR block 506 but the scrambler 1 504 provides a scrambling code that the XOR block 506 uses to provide known data at its output, which the PAM modulate block 508 modulates to produce the known data in a modulated transmission format. At this point in the operation, the remote master device has begun transmitting known data, which is received by the slave device (Step 758). The slave device uses the known data to retrain its DFE (Step 760). After retraining is completed, operation returns to step 752 where data is continued to be exchanged with the remote device.

Figure 8B:
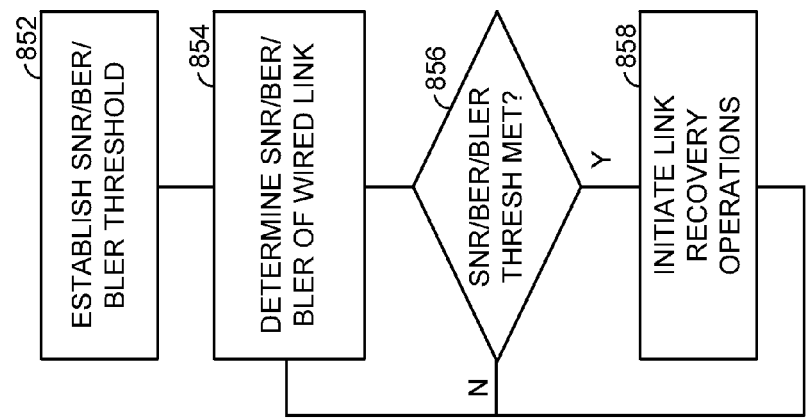
FIG. 8B is a flow chart illustrating differing EMI detection operations according to an embodiment in accordance with the present disclosure.
Figure 8A:
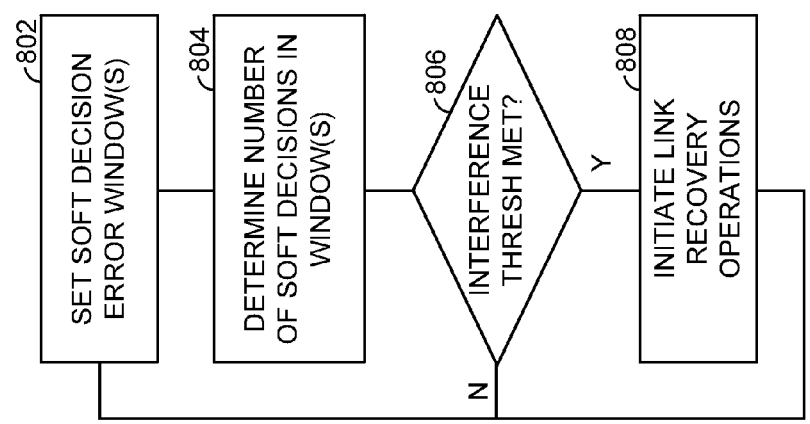
FIG. 8A is a flow chart illustrating EMI detection operations in accordance with the present disclosure.
Figure 9A:
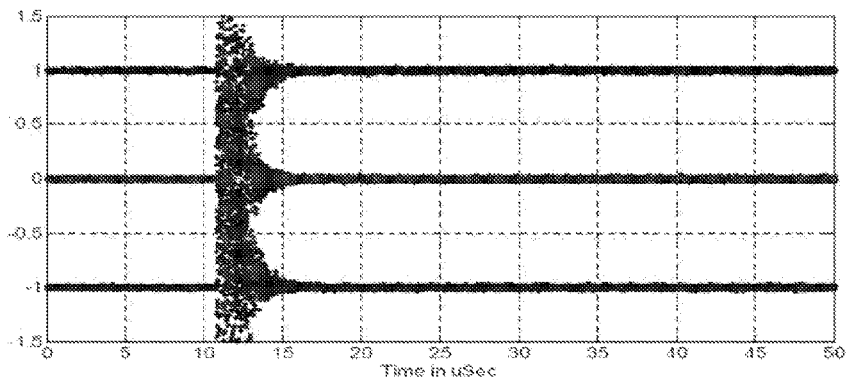
FIG. 9A is a graph illustrating EMI detection and recovery operations of a master device in accordance with the present disclosure.
Figure 9B:
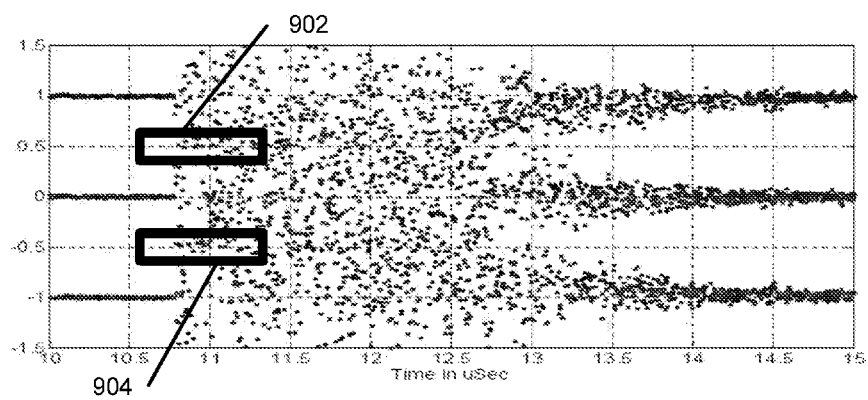
FIG. 9B is a graph illustrating EMI detection operations of a master device in accordance with the present disclosure.

FIG. 8A is a flow chart illustrating EMI detection operations in accordance with the present disclosure. With the operations of FIG. 8A, the device establishes one or more soft decision error windows (Step 802). FIG. 9A is a graph illustrating EMI detection and recovery operations of a master device in accordance with the present disclosure. FIG. 9B is a graph illustrating EMI detection operations of a master device in accordance with the present disclosure. FIG. 9B spans across a short duration of FIG. 9A to show in detail soft decision error windows 902 and 904, which slide in time with the receipt of soft data produced by the slicer 558 of FIG. 5B. The soft decision error windows reside about decision points at 0.5 and −0.5 at which no data is expected. Referring to both FIG. 8A and FIG. 9B, a number of soft decisions that reside within the soft decision error windows 902 and 904 is determined (Step 804). When these determined numbers exceed a predetermined count, the interference threshold is met at Step 806 and operation proceeds to Step 808 where error recovery operations are initiated. If the interference threshold is not met at Step 806, operation returns to Step 802 where the soft decision error window(s) are reset.

Figure 9C:
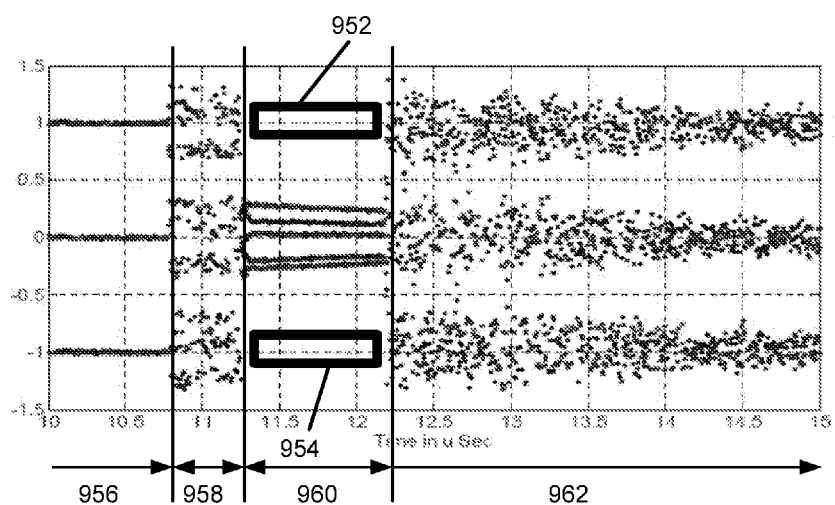
FIG. 9C is a graph illustrating EMI detection and recovery operations of a slave device in accordance with the present disclosure.

FIG. 9C is a graph illustrating EMI detection and recovery operations of a slave device in accordance with the present disclosure. The graph is divided into four distinct time periods. During time period 956, the wired link is operational with no or only minor EMI present and DFE operation is stable enough to accommodate any noise that is present. During time period 958, EMI is present on the link at sufficient levels to interrupt normal operation of the wired link. During period 958 the master device decides to enter link recovery operations. During time period 960, the master device has entered the idle mode in which it does not transmit data. In this mode, all decisions are near zero, with the lack of transmitted data affected only by the EMI on the wired link.

The slave device establishes sliding idle mode detection windows 952 and 954 similarly to the manner in which the master device establishes the soft error detection windows 902 and 904. However, an absence of soft decisions residing within the sliding idle mode detection windows 952 and 954 causes the slave device to determine that the master device is not transmitting data. When this decision is made, the slave device determines that it is receiving known data from the master device during time period 962 (Step 758 of FIG. 7B) and retrains its DFE using the known data (Step 760 of FIG. 7B).

FIG. 8B is a flow chart illustrating differing EMI detection operations according to an embodiment in accordance with the present disclosure. With the operations of FIG. 8B, one or more of a Signal to Interference Ratio (SNR) threshold level, a Bit Error Rate (BER) threshold level, or a Block Error Rate (BLER) threshold level are established (Step 852). The SNR, BER, and/or BLER of the wired link is then determined (Step 854). If the SNR/BER/BLER threshold is met at Step 856, operation proceeds to Step 858 where link recovery operations are initiated. If the SNR/BER/BLER threshold is not met at Step 856, operation returns to Step 854 where the quality of the wired link is again determined.

Figure 10:
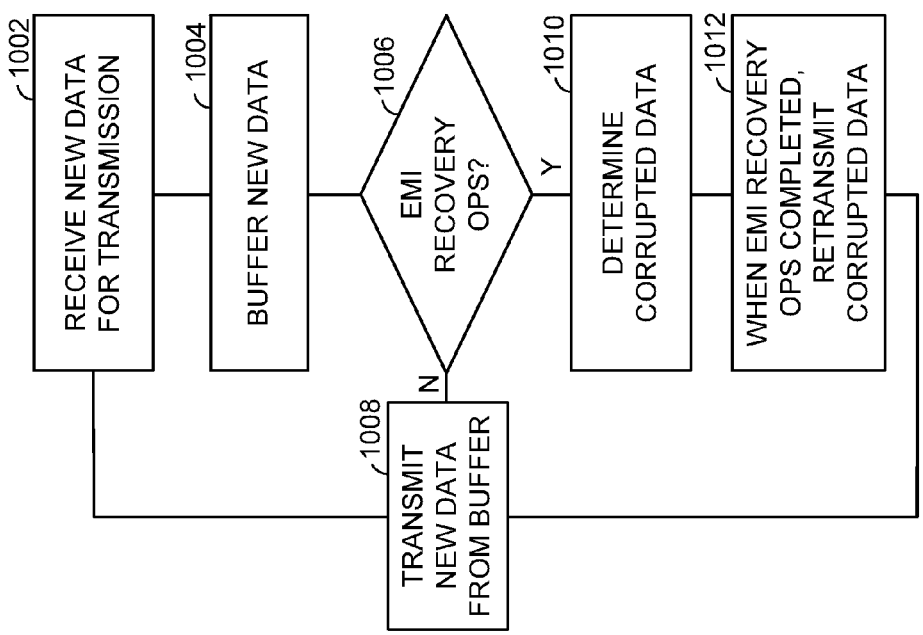
FIG. 10 is a flow chart illustrating data buffering and retransmission operations in accordance with the present disclosure.

FIG. 10 is a flow chart illustrating data buffering and retransmission operations in accordance with the present disclosure. There are multiple ways to deal with lost packets. Application or Network layers may simply drop the lost data packets or, alternately, request a repeated transmission of lost packets. Forward Error Correction (FEC) with large enough interleaving or PHY layer Automatic Retransmission reQuest (ARQ) operations may be used to correct for the errors.

Another option is that the data packets are buffered and retransmitted by the PHY when EMI is detected. This could be a good choice if offered traffic is less than PHY full data rate. Since the interruption is short in duration, a small increase in PHY data rate may cover for the lost bandwidth. Alternatively, implementing a flow control in PHY (IEEE Pause frame) could provide a loss less data transmission at near full throughput without increasing the PHY data rate. With the operations of FIG. 10, the device receives new data for transmission from its processing circuitry or from another device (Step 1002). The device then buffers the new data in its memory/buffer (Step 1004). The device then determines whether EMI recovery operations have been initiated (decision step 1006). When the device is operating normally, it transmits new data from its data buffer onto the wired link (Step 1008). However, when the device determines that it is in an EMI recovery mode, it determines what data has been transmitted onto the wired link that is likely corrupted by the EMI (Step 1010). Then, when the EMI recovery operations are completed, it retransmits the data that it has determined was likely corrupted by the EMI (Step 1012). From Step 1012, operations return to Step 1008.

The present disclosure has been described, at least in part, in terms of one or more embodiments. An embodiment of the present disclosure is used herein to illustrate the present disclosure, an aspect thereof, a feature thereof, a concept thereof, and/or an example thereof. A physical embodiment of an apparatus, an article of manufacture, a machine, and/or of a process that embodies the present disclosure may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A vehicle communication network device comprising:
a transceiver configured to communicatively couple with a remote transceiver of another vehicle communication network device via a wired media; and
processing circuitry coupled to the transceiver, wherein the processing circuitry and transceiver are configured to:
detect interference on the wired media that exceeds an interference threshold level by determining that a number of soft decisions that fall in a sliding soft decision error window exceeds an error threshold;
upon the detection, enter a quiet mode during which no data is transmitted on the wired media;
after exiting the quiet mode, enter an idle mode during which known data is transmitted on the wired media;
receive known data from the remote transceiver;
retrain the transceiver based upon the known data; and
after retraining the transceiver, exchange data with the remote transceiver.

2. The vehicle communication network device of claim 1, wherein the processing circuitry and transceiver are further configured to:
buffer data for transmission;
upon the detection, determine buffered data that was likely corrupted by the interference; and
after retraining, retransmit the determined buffered data.

3. The vehicle communication network device of claim 1, wherein the wired media comprises an unshielded twisted pair wire.

4. The vehicle communication network device of claim 3, wherein the transceiver further provides power to the remote transceiver via the unshielded twisted pair wire.

5. The vehicle communication network device of claim 1, wherein the transceiver supports wired local area network communications.

6. The vehicle communication network device of claim 1, wherein in detecting that the interference on the wired media exceeds the interference threshold level, the processing circuitry and transceiver are further configured to detect that a signal quality available on the wired media is less than at least one of a Signal to Interference Ratio (SNR) threshold level, a Bit Error Rate (BER) threshold level, or a Block Error Rate (BLER) threshold level.

7. The vehicle communication network device of claim 1:
further comprising a Decision Feedback Equalizer (DFE) configured to equalize incoming data; and
wherein retraining the transceiver using the known data comprises retraining the DFE using the known data.

8. A method of operating a vehicle communication network device comprising:
communicating with a remote transceiver of another vehicle communication network device via a transceiver and wired media;
detecting interference on the wired media that exceeds an interference threshold level by determining that a number of soft decisions that fall into a sliding soft decision error window exceeds an error threshold;
upon the detection, entering a quiet mode during which no data is transmitted on the wired media;
after exiting the quiet mode, entering an idle mode during which known data is transmitted on the wired media;
receiving known data from the remote transceiver;
retraining the transceiver based upon the known data; and
after retraining the transceiver, exchanging data with the remote transceiver.

9. The method of claim 8, further comprising:
buffering data for transmission;
upon the detection, determining buffered data that was likely corrupted by the interference; and
after retraining, retransmitting the determined buffered data.

10. The method of claim 8, wherein the wired media comprises an unshielded twisted pair wire.

11. The method of claim 10, further comprising providing power to the remote transceiver via the unshielded twisted pair wire.

12. The method of claim 8, further comprising the transceiver supporting wired local area network communications.

13. The method of claim 8, wherein in detecting that the interference on the wired media exceeds the interference threshold level, the method further comprises detecting that a signal quality available on the wired media falls is less than at least one of a Signal to Interference Ratio (SNR) threshold level, a Bit Error Rate (BER) threshold level, or a Block Error Rate (BLER) threshold level.

14. The method of claim 8:
further comprising equalizing incoming data using a Decision Feedback Equalizer (DFE); and
wherein retraining the transceiver using the known data comprises retraining the DFE using the known data.

15. A method of operating a vehicle communication network device comprising:
buffering data for transmission to a remote transceiver of another vehicle communication network device via a transceiver and wired media;
detecting interference on the wired media that exceeds an interference threshold level by determining that a number of soft decisions that fall into a sliding soft decision error window exceeds an error threshold;
upon the detection, entering a quiet mode during which no data is transmitted on the wired media and determining buffered data that was likely corrupted by the interference;
after exiting the quiet mode, entering an idle mode during which known data is transmitted on the wired media;
receiving known data from the remote transceiver;
retraining the transceiver based upon the known data; and
after retraining the transceiver, exchanging data with the remote transceiver including retransmitting the determined buffered data.

16. The method of claim 15, wherein the wired media comprises an unshielded twisted pair wire.

17. The method of claim 16, further comprising providing power to the remote transceiver via the unshielded twisted pair wire.

18. The method of claim 15, further comprising the transceiver supporting wired local area network communications.

19. The method of claim 15, wherein in detecting that the interference on the wired media exceeds the interference threshold level, the method further comprises detecting that a signal quality available on the wired media falls is less than at least one of a Signal to Interference Ratio (SNR) threshold level, a Bit Error Rate (BER) threshold level, or a Block Error Rate (BLER) threshold level.

20. The method of claim 15:
further comprising equalizing incoming data using a Decision Feedback Equalizer (DFE); and
wherein retraining the transceiver using the known data comprises retraining the DFE using the known data.

\* \* \* \* \*